United States Patent [19]

Lucas

[11] Patent Number: 4,563,498

[45] Date of Patent: Jan. 7, 1986

[54] CURABLE SILICONE COMPOSITIONS AND PROCESSES

[75] Inventor: Gary M. Lucas, Scotia, N.Y.

[73] Assignee: General Electric Company, Waterford, N.Y.

[21] Appl. No.: 627,952

[22] Filed: Jul. 5, 1984

[51] Int. Cl.[4] .............................. C08K 3/26; C08K 3/36; C08G 77/06

[52] U.S. Cl. ..................... 524/788; 524/789; 524/860; 524/861; 524/862; 528/15; 528/21; 528/33; 528/901

[58] Field of Search ............... 528/21, 15, 901, 33; 524/860, 861, 862, 788, 789

[56] References Cited

U.S. PATENT DOCUMENTS

| | | | |
|---|---|---|---|
| 3,161,614 | 12/1964 | Brown et al. | 260/46.5 |
| 3,383,355 | 5/1968 | Cooper | 260/46.5 |
| 3,542,901 | 11/1970 | Cooper et al. | 260/825 |
| 4,395,526 | 7/1983 | White et al. | 528/18 |
| 4,417,042 | 11/1983 | Dziark | 528/18 |
| 4,461,867 | 7/1984 | Suprenant | 524/860 |
| 4,483,972 | 11/1984 | Mitchell | 528/15 |
| 4,483,973 | 11/1984 | Lucas et al. | 528/21 |
| 4,489,191 | 12/1984 | Chung | 528/21 |
| 4,489,199 | 12/1984 | Wengrovius | 528/21 |
| 4,489,200 | 12/1984 | Dziark | 528/901 |

*Primary Examiner*—Herbert J. Lilling
*Attorney, Agent, or Firm*—Gary L. Loser

[57] ABSTRACT

A room temperature vulcanizable silicone composition free of plasticizing fluid and curable to a low modulus silicone rubber upon exposure to moisture, comprising:

(A) 100 parts by weight of an organopolysiloxane wherein the silicon atoms at the polymer chain ends are terminated with at least two alkoxy radicals, said organopolysiloxane having a viscosity ranging from about 20,000 centipoise to about 500,000 centipoise at 25° C.;

(B) up to 100 parts by weight filler per 100 parts by weight of organopolysiloxane, there being present at least 5 parts by weight of reinforcing filler, or 20 parts by weight of extending filler, or mixture thereof;

(C) from 0.05 to 5 parts by weight of an adhesion promoter per 100 parts by weight of organopolysiloxane; and (D) an effective amount of condensation catalyst.

19 Claims, No Drawings

CURABLE SILICONE COMPOSITIONS AND PROCESSES

BACKGROUND OF THE INVENTION

The present invention relates to curable silicone rubber compositions. More particularly, the present invention relates to one-component, alkoxy-functional, room temperature vulcanizable (RTV) silicone compositions which exhibit low modulus upon curing. Processes for making such low modulus silicone compositions are also provided.

Elastomeric siloxane compositions capable of vulcanizing at room temperature have achieved considerable commercial success. In certain applications, such as high rise building construction, it is desirable and often critical to utilize low modulus sealants for adhering the window panes to the metal frame of the building. This low modulus property enables the silicone elastomer to easily compress and expand with building movement due to winds and the like without causing cohesive or adhesive failure. In addition to being a low modulus composition, it is often important that the silicone composition also have high tensile strength and high elongation. These properties will ensure that the silicone elastomer can accommodate, for example, plus or minus 50% compression or extension in the joints without failing. Of course, the more the sealant can expand and compress in terms of thickness of the joint, the more desirable it is for use as a construction sealant.

Because of the recent emphasis by architects on "mirrored" high rise buildings, that is, the exterior of the building appears to be a large mirror, for both aesthetic and energy-saving reasons, there has been a great deal of interest in providing suitable low modulus silicone sealants. Perhaps the most common type of low modulus silicone sealant is based on a silanol endblocked polydiorganosiloxane in combination with any of a number of crosslinking and/or coupling agents which impart low modulus to the cured composition.

Clark et al., U.S. Pat. No. 3,766,127, discloses a composition stable under moisture free conditions and curable to a low modulus silicone elastomer comprising a mixture of 100 parts by weight of a hydroxyl endblocked polydiorganosiloxane; 0 to 150 parts by weight of a non-acidic, non-reinforcing filler; 3.5 to 8 parts by weight of

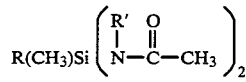

in which R is methyl or vinyl, R' is methyl, ethyl or phenyl and 0.3 to 4.2 parts by weight of

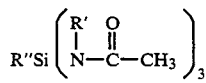

in which R' is defined above and R" is the same as R.

Brady et al., U.S. Pat. No. 3,766,128, relates to a low modulus room temperature vulcanizable silicone elastomer obtained by curing a mixture of 100 parts by weight of a hydroxyl endblocked polydiorganosiloxane; 0 to 150 parts by weight of a non-acidic, non-reinforcing filler; 2 to 7.5 parts by weight methylvinyldi-(N-methylacetamido)silane and 0.5 to 4 parts by weight of an aminosilane of the formula RSi(NR'R")$_3$ in which R is alkyl, phenyl or vinyl, R' is hydrogen or alkyl and R" is alkyl or phenyl.

Toporcer et al., U.S. Pat. No. 3,817,909, describes low modulus room temperature vulcanizable silicone elastomers obtained by mixing 100 parts by weight of a hydroxyl endblocked polydiorganosiloxane; 0 to 150 parts by weight of a non-acidic, non-reinforcing filler; 2 to 20 parts by weight of

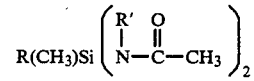

in which R is methyl, vinyl or phenyl and R' is methyl, ethyl or phenyl and 0.25 to 7 parts by weight of an aminooxysilicon compound having 3 to 10 aminoxy groups per molecule.

Klosowski, U.S. Pat. No. 3,996,184, relates to a one package, low modulus, room temperature vulcanizable composition obtained by mixing 100 parts by weight of a hydroxyl endblocked polydimethylsiloxane; 0 to 200 parts by weight of a non-acidic, non-reinforcing filler; 2.5 to 10 parts by weight of

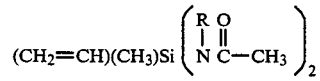

in which R is methyl or phenyl; 1 to 6 parts by weight of an aminoxysilicon compound having 3 to 10 aminoxy groups per molecule; and 1 to 5 parts by weight of N,N-dimethylformamide, acetonitrile, or N-n-butylacetamide.

Beers, U.S. Pat. No. 4,100,129, discloses self-bonding, low modulus, one-package room temperature vulcanizable silicone compositions comprising a silanol chain-stopped polydiorganosiloxane; a crosslinking silane; and a silanol reactive organometallic ester compound of a metal, the compound having radicals attached to the metal atom, at least one of the radicals being a substituted or unsubstituted hydrocarbonoxy radical, attachment being through an M—O—C linkage where M is the metal, and any remaining valences of M are satisfied by other organo radicals attached to M through such linkages, or an —OH, —O—, or M—O—M linkage, the weight ratio of the organometallic ester to silane being at least 0.5 to 1.

Beers, U.S. Pat. No. 4,323,489, teaches a room temperature vulcanizable silicone rubber composition with low modulus comprising a silanol endstopped diorganopolysiloxane, a difunctional acetamide coupler, and as the crosslinking agent, a minor amount of compound selected from ketoxime functional and aminoxy functional silanes and mixtures thereof.

Hahn, U.S. Pat. No. 4,360,631, describes a flowable, low modulus, room temperature vulcanizable silicone composition obtained by mixing 100 parts by weight of hydroxyl endblocked polydiorganosiloxane; 0 to 150 parts by weight of a non-acidic, non-reinforcing filler; 2 to 20 parts by weight of methylvinyldi-(epsilon-caprolactamo)silane and 0.25 to 7 parts by weight of an aminoxysilane compound having 3 to 10 aminoxy groups per molecule.

Lampe, U.S. Pat. No. 4,410,677, provides a low modulus, room temperature vulcanizable silicone rubber composition with a good shelf life comprising a silanol containing polysiloxane, a filler, an acyloxy functional silane as the crosslinking agent, and as the catalyst, a compound selected from the group consisting of zinc salts and zirconium salts, or a co-catalyst system comprising as one co-catalyst a tin salt of a carboxylic acid and as the other co-catalyst, either a zinc salt or a zirconium salt of a carboxylic acid.

Another class of low modulus silicone compositions is based on alkoxy terminated polydiorganosiloxanes originally disclosed by Brown et al. in U.S. Pat. No. 3,161,614. The problem with providing low modulus RTV compositions based on polyalkoxy terminated siloxanes is that they already contain at least two terminal functional groups for effecting crosslinking whereas silanol terminated siloxanes are monofunctional and can easily be chain-extended with a coupling agent to provide the desired low modulus.

Cooper et al., U.S. Pat. No. 3,542,901, teaches that one-component silicone RTV compositions of the type disclosed by Brown et al. are ineffective for certain sealing applications because the modulus is too high. Cooper et al. goes on to disclose a method to provide compositions vulcanizable to low modulus rubbers comprising utilizing a polydiorganosiloxane having therein a proportion, up to 40 percent, of terminal units of the formula —SiR$_3$, the remaining terminal units being alkoxy functional. Preferably the polydiorganosiloxane has a viscosity within the range of 2,000 to 20,000 centipoise at 25° C.

Beers, U.S. patent application Ser. No. 349,537, filed Feb. 17, 1982, now abandoned, discloses that alkoxy functional RTV compositions of the type disclosed by White et al., U.S. Pat. No. 4,395,526, and Dziark, U.S. Pat. No. 4,417,042, can be made low modulus by adding thereto from 2 to 20 parts by weight of a plasticizer fluid containing a high degree of trifunctional siloxy units or a mixture of trifunctional and tetrafunctional siloxy units. Optionally, additional plasticizers such as linear triorganosiloxy endstopped polydiorganosiloxanes having a viscosity ranging from 10 centipoise to 20,000 centipoise can be included in the composition.

Other patents of interest with respect to one or more aspects of the present invention are Murphy, U.S. Pat. Nos. 3,341,486, 3,441,583, 3,528,941 and 3,926,199 which are directed to aminoxy functional RTV compositions. Golitz et al., U.S. Pat. No. 3,417,042 provides an acetamide or amide functional one-component RTV composition formed by mixing a silanol terminated base polymer with an amide functional silane or siloxane crosslinking agent. A similar composition is disclosed in Klebe, U.S. Pat. No. 3,488,371 as well as in Toporcer, U.S. Pat. No. 3,776,934.

All of the foregoing patents and patent applications are incorporated by reference into the present patent application.

Although a wide choice is thus seen to be available for the preparation of low modulus, one-component RTV compositions, there has not been much appreciation by those skilled in the art of the factors involved in securing specific properties in the cured silicone rubber, especially when the polysiloxane is alkoxy functional. It is known, for example, that some variations in properties can be induced in the cured composition by varying the molecular weight of the polydiorganosiloxane. That is, as the molecular weight increases, elongation of the rubber also increases and, on the other hand, if a lower viscosity material is used, the cure is tighter causing lower elongation and increased hardness. The adhesion of the composition to a variety of conventional substrates is also a factor which can generally be predictably influenced, for example, by incorporating a suitable adhesion promoter. In any event, both modulus control and adhesion control are not easily achieved, especially in polyalkoxy functional systems, and there still is a lot to be desired in the present state of the art. Of particular concern is the need to include plasticizing fluids in alkoxy functional one component silicone RTV compositions in order to obtain commercially useful low modulus compositions. The problem with such compositions is that volatiles in the plasticizing fluids tend to migrate out of the sealant and onto the sealant substrate. Subsequently, dirt and dust particles become embodied therein, adversely affecting the substrates appearance by causing it to appear "stained".

It has now been discovered that alkoxy functional, low modulus, silicone RTV compositions can be prepared from conventional ingredients at properly selected ratios without the need for such plasticizing fluids.

SUMMARY OF THE INVENTION

It is one object of the present invention to provide low modulus, alkoxy functional, one component silicone RTV compositions suitable for use as construction sealants.

It is another object of the present invention to provide low modulus, alkoxy functional, one component silicone RTV compositions which do not cause staining due to plasticizer bleeding.

It is yet another object of the present invention to provide a process for producing a curable one-component silicone RTV composition having low modulus in the cured state.

In accordance with the foregoing objects there is provided a low modulus, alkoxy functional, room temperature vulcanizable, silicone rubber composition free of plasticizing fluid, comprising:
(A) 100 parts by weight of an organopolysiloxane wherein the silicon atoms at the polymer chain ends are terminated with at least two alkoxy radicals, said organopolysiloxane having a viscosity ranging from about 20,000 centipoise to about 500,000 centipoise at 25° C.;
(B) up to 100 parts by weight of filler per 100 parts by weight of organopolysiloxane, there being present not more than 4 parts by weight of reinforcing filler, or at least 20 parts by weight of extending filler, or a mixture thereof;
(C) from 0.05 to 5 parts by weight of an adhesion promoter per 100 parts by weight of organopolysiloxane; and
(D) an effective amount of condensation catalyst.

In a particularly preferred embodiment of the present invention there is further included in the silicone RTV composition a stabilizing amount of scavenger for hydroxy functional groups.

DESCRIPTION OF THE INVENTION

The basic component of the one package room temperature vulcanizable composition of the present invention is a polyalkoxy terminated polydiorganosiloxane having a viscosity ranging from about 20,000 centipoise to about 500,000 centipoise at 25° C. Preferably, the viscosity of the polydiorganosiloxane ranges from 30,000 centipoise to 200,000 centipoise, and, most preferably, the viscosity ranges from 40,000 centipoise to 80,000 centipoise at 25° C.

The organo groups of said polydiorganosiloxane are selected from $C_{(1-13)}$ monovalent substituted and unsubstituted hydrocarbon radicals. Preferably the organo groups are methyl or a mixture of a major amount of methyl and a minor amount of phenyl, cyanoethyl, vinyl, 3,3,3-trifluoropropyl, or mixture thereof. Examples of other suitable organo groups are aryl radicals and halogenated aryl radicals such as phenyl, tolyl, chlorophenyl and naphthyl; aliphatic and cycloaliphatic radicals such as cyclohexyl, cyclobutyl, alkyl and alkenyl radicals such as ethyl, propyl, chloropropyl, vinyl and allyl; and cyanoalkyl radicals such as cyanoethyl, cyanopropyl and cyanobutyl.

Also included within the intended scope of polyalkoxy functional polysiloxanes are the polymers described in the copending patent application of Gary M. Lucas, Ser. No. 449,105, filed Dec. 13, 1982, and incorporated herein by reference. Briefly, this patent application discloses polymers which contain a mixture of polyalkoxy and monoalkoxy terminated polydiorganoxiloxanes as well as polymers which are terminated with one alkoxy radical and one radical selected from the group consisting of silazy, amido, amino, carbamato, enoxy, imidato, isocyanato, oximato, thioisocyanato and ureido radicals.

Polydiorganosiloxanes useful for practicing the present invention as well as methods for their preparation are well known to those skilled in the art. The reader interested in obtaining more detailed information is referred to U.S. Pat. Nos. 3,161,614, 3,383,355, 3,542,901 and 4,395,526, all of which are incorporated herein by reference.

The compositions of the instant invention also contain not more than 4 percent by weight of reinforcing filler, or at least twenty parts by weight of extending filler, or mixture thereof per 100 parts by weight of organopolysiloxane. If a mixture of such reinforcing and extending fillers is employed, one may utilize, for example, three parts by weight reinforcing filler and five parts by weight extending filler or two parts by weight reinforcing filler and ten parts by weight extending filler; i.e. five parts extending filler are approximately equivalent to one part reinforcing filler. Preferably, there is employed from one to four percent by weight reinforcing filler in combination with thirty to forty five percent by weight extending filler based on the total weight of the silicone RTV composition.

Generally, the amount of reinforcing filler should not exceed about four percent by weight, and the amount of extending filler should not exceed about fifty percent by weight based on the combined weight of organopolysiloxane and filler. It is important to note that if these ratios are substantially exceeded an RTV composition having low modulus and high elongation and tensile strength will not be obtained.

Examples of reinforcing fillers suitable for use in the present invention are fumed silica and precipitated silica. Reinforcing fillers are particularly useful if it is desired to increase the tensile strength of the cured elastomer. A disadvantage of the reinforcing fillers, however, is that they increase the viscosity of the uncured composition and decrease the elongation of the cured composition. These disadvantages can be overcome to a large extent by treating the filler with cyclopolysiloxanes, for example, as taught in U.S. Pat. No. 2,938,009, or with silazanes, as taught in U.S. Pat. No. 3,635,743. Both of these patents are incorporated into the present disclosure by reference. Other methods for treating reinforcing fillers to overcome the aforesaid disadvantages are also known to those or ordinary skill in the art.

Suitable extending fillers for practicing the present invention include titanium dioxide, zirconium silicate, silica aerogel, iron oxide, diatomaceous earth, glass fibers, polyvinyl chloride, ground quartz, lithopone, zinc oxide, calcium carbonate, magnesium oxide, zirconium oxide, aluminum oxide, calcined clay, carbon black, graphite and the like. Extending fillers are especially useful if it is desired to increase the tensile strength without unduly decreasing the elongation of the cured composition, and without unduly increasing the viscosity of the uncured composition.

It has been found that fumed silica, especially treated fumed silica, is the most preferred reinforcing filler and that calcium carbonate the most preferred extending filler. Most preferably there is utilized a mixture of reinforcing filler and extending filler.

The compositions of the present invention also contain from 0.05 to 5 parts by weight of adhesion promoter per 100 parts by weight polydiorganosiloxane. Preferably the adhesion promoter is free of amino functionality as such amino groups may cause undesirable condensation of the organopolysiloxane and thereby alter the properties of the resulting composition.

Particularly preferred adhesion promoters free of amino functionality are disclosed in U.S. patent application Ser. No. 349,538, filed Feb. 17, 1982 now U.S. Pat. No. 4,483,973. This patent application also discloses a variety of less preferred amino functional adhesion promoters. Briefly, such adhesion promoters have the general formula

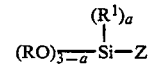

where R and $R^1$ are independently selected $C_{(1-8)}$ monovalent hydrocarbon radicals, a varies from 0 to 3, and Z is a saturated, unsaturated, or aromatic hydrocarbon residue further functionalized by a member selected from the group consisting of amino, ether, epoxy, cyano, isocyanato, acryloxy, acyloxy and mixtures thereof.

Examples of particularly preferred adhesion promoters free of amino functionality are, for example, γ-glycidoxypropyltrimethoxysilane, tris(1,3,5-trimethoxysilylpropyl)isocyanurate, γ-isocyanatopropyltrimethoxysilane, γ-methacryloxypropyltrimethoxysilane, γ-acetoxypropyltrimethoxysilane, vinyltrimethoxysilane, β-(3,4-epoxycyclohexyl)ethyltrimethoxysilane, β-cyanoethyltrimethoxysilane.

Smith et al., U.S. Pat. No. 4,273,698, discloses maleate, fumarate and succinate functional adhesion promoters suitable for use in practicing the present invention. Generally, these compounds have the formulas:

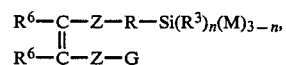

-continued

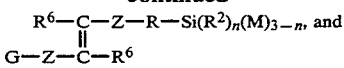

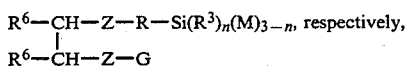

where Z is selected from

phenylene, C=O, CONH and CON(R$^2$)$_2$, G is selected from the group consisting of hydrogen, R$^1$, and R$^4$Si(R$^2$)$_n$(M)$_{3-n}$ where R$^1$ is a monovalent hydrocarbon radical or halogenated monovalent hydrocarbon radical; R is a divalent hydrocarbon radical, R$^2$ is a monovalent hydrocarbon radical or halogenated hydrocarbon radical, M is selected from R$^3$O, R$^3$, and

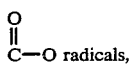

where R$^3$ is a monovalent hydrocarbon radical or halogenated monovalent hydrocarbon radical, R$^6$ is hydrogen or an alkyl radical of up to 10 carbon atoms, and n varies from 1 to 3.

A particularly preferred adhesion promoter within the aforesaid description is bis(trimethoxysilylpropyl)maleate. The corresponding fumarates and succinates are also preferred adhesion promoters.

Preferred amino-containing adhesion promoters described by Lucas and Dziark, application Ser. No. 349,538, filed Feb. 17, 1982, are γ-aminopropyltrimethoxysilane, γ-aminopropyltriethoxysilane, 3-(2-aminoethylamino)propyltrimethoxysilane. Other suitable adhesion promoters will be obvious to those skilled in the art or can readily be ascertained without undue experimentation.

Both U.S. Pat. No. 4,483,973 and U.S. Pat. No. 4,273,698 are incorporated into the present application by reference. Also, suitable adhesion promoters can be found in U.S. Pat. Nos. 3,517,001, 3,816,494, 3,888,815 and 4,036,813, all of which are also incorporated herein by reference.

Effective amounts of condensation catalysts which can be used in the practice of the present invention to facilitate the cure of the RTV composition are, for example, from about 0.001 to about 5 parts by weight based on the weight of polydiorganosiloxane. Suitable condensation catalysts well known to those skilled in the art include tin compounds, such as dibutyltindilaurate, dibutyltindiacetate, dibutyltindimethoxide, tin octoate, dimethyl tin dibutyrate, tin oleate, and tin naphthenate; titanium compounds, such as 1,3-propanedioxytitanium bis(acetylacetonate), diisopropoxytitanium bis(acetyacetonate), titanium naphthenate, tetrabutyltintitanate and tetraphenyltitanate; other metal compounds, such as zirconium octoate, lead-2-ethyloctoate, iron-2-ethylhexoate, cobalt-2-ethylhexoate, antimony octoate and zinc steartate; and non metal compounds such as hexylammonium acetate and benzyltrimethylammonium acetate. These and many other compounds are well known to those skilled in the art as suitable condensation cure catalysts.

Optionally, there may be included in the silicone RTV composition of the present invention a silane crosslinking agent of the formula

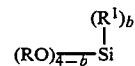

where R is a C$_{(1-8)}$ aliphatic organic radical selected from alkyl radicals, alkylether radicals, alkylester radicals, alkylketone radicals and alkylcyano radicals or a C$_{(7-13)}$ aralkyl radical, and R$^1$ is a C$_{(1-13)}$ monovalent organic radical. Such crosslinking agents are well known in the art and described more fully, for example, in U.S. Pat. No. 4,395,526.

In a particularly preferred embodiment of the instant invention there is further included a stabilizing amount of scavenger for hydroxy functional groups. Particularly preferred scavengers for hydroxy functional groups are disclosed in U.S. Pat. Nos. 4,395,526 and 4,417,042, both of which are incorporated by reference into the present application.

Other scavengers for hydroxy functional groups are described in U.S. patent application Ser. Nos. 497,954, filed May 25, 1983; 338,518, filed Jan. 11, 1982 now U.S. Pat. No. 4,424,157; 428,038, filed Sept. 29, 1982; 497,777, filed May 25, 1983; now U.S. Pat. No. 4,495,330; 464,443, filed Feb. 7, 1983 now U.S. Pat. No. 4,503,209; and 476,000, filed Mar. 17, 1983 now U.S. Pat. No. 4,523,001. Each of the foregoing patent applications is hereby incorporated by reference into the present disclosure.

Where desired, the artisan may further include sag control agents, pigments, flame retardants and the like.

The room temperature vulcanizable compositions can be made by agitating, for example stirring, a mixture of polyalkoxy-terminated polydiorganosiloxane, filler, adhesion promoter, and any of the optional ingredients described hereinabove in the substantial absence of atmospheric moisture. The term "substantial absence of moisture" means mixing in a dry box, or in a closed container which has been subjected to vacuum to remove air, which thereafter is replaced with a dry inert gas such as nitrogen. Temperatures can vary from about 0° C. to about 180° C. depending upon the degree of blending and the type and amount of filler.

The compositions of this invention when cured provide elastomers having a modulus at 50% extension of about 20–50 psi and a modulus at 100% extension of about 40–80 psi. The compositions also provide cured elastomers having an ultimate tensile strength of about 150 to 300 psi, an ultimate percent elongation of about 600 to 1200, durometer (Shore A) of about 20–40 psi, and an application rate of 100 to 300 grams per minute.

In order to better enable the artisan to practice the present invention the following examples are offered by way of illustration and are not intended to be limiting in any manner. All parts are by weight unless otherwise stated.

EXAMPLES

Example 1

A mixer equipped with a vacuum line and nitrogen purge was charged with 840 parts by weight methyldimethoxy terminated polydimethylsiloxane having a viscosity of 120,000 cps at 25° C.; 840 parts by weight methyldimethoxy terminated polydimethylsiloxane having a viscosity of 25,000 cps at 25° C.; 144 parts by weight octamethylcyclotetrasiloxane treated fumed silica (4.4% by weight) and 1440 parts by weight calcium carbonate. The mixture was then agitated under vacuum (20 mm Hg) at room temperature for one hour. To 1500 parts of this mixture there was added 30 parts by weight of hexamethyldisilazane, 15 parts by weight cyanoethyltrimethoxysilane and 1.5 parts by weight dibutyltindiacetate. After mixing for fifteen minutes at room temperature the sealant was packaged into 8 ounce plastic tubes and stored for 24 hours at room temperature. The composition was then formed into test sheets according to ASTM standards, and after curing for seven days, the following results were obtained.

TABLE 1

| Property | Result |
| --- | --- |
| Specific Gravity | 1.350 |
| 50% Modulus | 59 |
| 100% Modulus | 68 |
| Elongation, % | 438 |
| Tensile, psi | 183 |
| Shore A | 23 |
| Application rate, g/min | 82 |

This example shows that when as little as a ten percent excess of fumed silica is employed in practicing the present invention, the low modulus properties of the composition are lost, i.e. 50% modulus is 59 instead of in the range of 20 to 50, percent elongation is only 438 rather than in the range 600 to 1200, and the application rate is only 82 grams per minute.

Example 2

In this Example, a composition was prepared in accordance with Example 1, except that 84 parts (2.6% by weight) octamethylcyclotetrasiloxane treated fumed silica were utilized. Again, the sealant was packaged into 8 ounce plastic tubes and stored for 24 hours at room temperature prior to preparing ASTM test sheets. After curing for seven days, the following results were determined from the test sheets.

TABLE 2

| Property | Result |
| --- | --- |
| Specific Gravity | 1.370 |
| 50% Modulus | 40 |
| 100% Modulus | 67 |
| Elongation, % | 734 |
| Tensile, psi | 209 |
| Shore A | 26 |
| Application rate, g/min | 154 |

Thus, this Example illustrates that when a composition is prepared in accordance with the teaching of the present application, there is obtained the desired, low modulus composition.

I claim:

1. A room temperature vulcanizable silicone composition free of plasticizing fluid and curable to a low modulus silicone rubber upon exposure to moisture, comprising:
    (A) 100 parts by weight of an organopolysiloxane wherein the silicon atoms at the polymer chain ends are terminated with at least two alkoxy radicals, said organopolysiloxane having a viscosity ranging from about 20,000 centipoise to about 500,000 centipoise at 25° C.;
    (B) up to 100 parts by weight filler per 100 parts by weight of organopolysiloxane, there being present not more than 4 parts by weight of reinforcing filler, or at least 20 parts by weight of extending filler, or mixture thereof;
    (C) from 0.05 to 5 parts by weight of an adhesion promoter per 100 parts by weight of organopolysiloxane; and
    (D) an effective amount of condensation catalyst.

2. The composition of claim 1 wherein the viscosity of the organopolysiloxane ranges from 30,000 centipoise to 200,000 centipoise at 25° C.

3. The composition of claim 1 wherein the viscosity of the organopolysiloxane ranges from 40,000 centipoise to 80,000 centipoise at 25° C.

4. The composition of claim 1 wherein there is present from about 1 to about 5 percent by weight reinforcing filler and from about 30 to about 45 percent by weight extending filler based on the total weight of the composition.

5. The composition of claim 4 wherein the reinforcing filler is fumed silica or treated fumed silica and the extending filler is calcium carbonate.

6. The composition of claim 1 wherein the adhesion promoter is free of amino groups.

7. The composition of claim 1 wherein the condensation catalyst is present in an amount ranging from 0.001 to about 5 parts by weight.

8. The composition of claim 1 further comprising a silane crosslinking agent of the formula

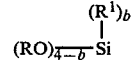

where R is a $C_{(1-8)}$ aliphatic organic radical selected from alkyl radicals, alkylether radicals, alkylester radicals, alkylketone radicals and alkylcyano radicals or a $C_{(7-13)}$ aralkyl radical, and $R^1$ is a $C_{(1-13)}$ monovalent organic radical.

9. The composition of claim 1 further comprising an effective amount of scavenger for hydroxy functional groups.

10. A method for making a room temperature vulcanizable composition free of plasticizing agent and curable to a low modulus silicone rubber upon exposure to moisture, comprising:
    I. mixing in the substantial absence of moisture at a temperature in the range of from 0° C. to 180° C.:
        (A) 100 parts by weight of an organopolysiloxane wherein the silicon atoms at the polymer chain ends are terminated with at least two alkoxy radicals, said organopolysiloxane having a viscosity ranging from about 20,000 centipoise to about 500,000 centipoise at 25° C.;
        (B) up to 100 parts by weight filler per 100 parts by weight organopolysiloxane, there being present not more than 4 parts by weight of reinforcing filler or at least 20 parts by weight of extending filler or mixture thereof;
        (C) from 0.05 to 5 parts by weight of an adhesion promoter per 100 parts by weight of organopolysiloxane; and
        (D) an effective amount of condensation catalyst.

11. The method of claim 10 wherein the viscosity of the organopolysiloxane ranges from 30,000 centipoise to 200,000 centipoise at 25° C.

12. The method of claim 10 wherein the viscosity of the organopolysiloxane ranges from 40,000 centipoise to 80,000 centipoise at 25° C.

13. The method of claim 10 wherein there is present from about 1 to about 5 percent by weight reinforcing filler and from about 30 to about 45 percent by weight extending filler based on the total weight of the composition.

14. The method of claim 13 wherein the reinforcing filler is fumed silica or treated fumed silica and the extending filler is calcium carbonate.

15. The method of claim 10 wherein the adhesion promoter is free of amino groups.

16. The method of claim 10 wherein the condensation catalyst is present in an amount ranging from 0.001 to about 5 parts by weight.

17. The method of claim 10 further comprising mixing a silane crosslinking agent of the formula

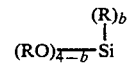

where R is a $C_{(1-8)}$ aliphatic organic radical selected from alkyl radicals, alkylether radicals, alkylester radicals, alkylketone radicals and alkylcyano radicals or a $C_{(7-13)}$ aralkyl radical, and $R^1$ is a $C_{(1-13)}$ monovalent organic radical.

18. The method of claim 10 further comprising mixing an effective amount of scavenger for hydroxy functional groups.

19. The cured composition of claim 1.

* * * * *